(12) United States Patent
Applewhite et al.

(10) Patent No.: US 6,711,575 B1
(45) Date of Patent: Mar. 23, 2004

(54) METHODS AND SYSTEMS FOR PROVIDING CONTROLLABLE ACCESS TO INFORMATION CONTAINED IN REPOSITORIES

(75) Inventors: Jarratt Applewhite, Santa Fe, NM (US); Gregory D. Miller, Albuquerque, NM (US)

(73) Assignee: SAMBA Holdings, Inc., Albuquerque, NM (US)

( * ) Notice: Subject to any disclaimer, the term of this patent is extended or adjusted under 35 U.S.C. 154(b) by 140 days.

(21) Appl. No.: 09/680,522

(22) Filed: Oct. 6, 2000

(51) Int. Cl.[7] .............................. G06F 7/00; G09G 3/20

(52) U.S. Cl. ...................... 707/100; 707/102; 707/9; 345/744

(58) Field of Search ...................... 707/1–5, 9–10, 707/100, 102–103, 204

(56) References Cited

U.S. PATENT DOCUMENTS

| | | | | |
|---|---|---|---|---|
| 5,940,843 | A | 8/1999 | Zucknovich et al. | 707/516 |
| 6,253,194 | B1 | 6/2001 | Johnson et al. | 702/2 |
| 6,292,904 | B1 * | 9/2001 | Broomhall et al. | 709/217 |
| 6,304,882 | B1 * | 10/2001 | Strellis et al. | 707/202 |
| 6,356,920 | B1 | 3/2002 | Vandersluis | |
| 6,408,282 | B1 * | 6/2002 | Buist | 705/36 |
| 2003/0033526 | A1 * | 2/2003 | French et al. | 713/168 |

* cited by examiner

Primary Examiner—Alford Kindred
(74) Attorney, Agent, or Firm—Fulbright & Jaworski, LLP (57) ABSTRACT

Methods and systems are disclosed for providing controllable public access to information contained in government records stored in a repository, comprising the steps of: copying information from the repository to a replica database; providing a plurality of secondary databases each containing an application-specific subset of information in the replica database; and providing an application interface process for each secondary database to enable controllable access to information in a secondary database.

29 Claims, 5 Drawing Sheets

METHODS AND SYSTEMS FOR PROVIDING CONTROLLABLE ACCESS TO INFORMATION CONTAINED IN REPOSITORIES

CROSS-REFERENCE TO RELATED APPLICATIONS

This application claims priority from U.S. Nonprovisional Patent Application No. 09/549,097, which was filed on Apr. 12, 2000.

FIELD OF THE INVENTION

This invention relates to access to public records over a computer network.

BACKGROUND OF THE INVENTION

In recent years there has been an increase in the amount of information stored by federal and state governments which must be made available to the public pursuant to open records statutes. There has also been an increase in the amount of information that businesses and individuals are required by law to provide to the government.

Because of funding deficiencies, government agencies have not kept pace with the constantly improving technologies for distributing and accessing electronically stored information. Most existing computer systems employed by governments are outdated and incompatible with the newer systems purchased by businesses and other members of the general public. Thus, direct public access to government repositories by electronic means is impracticable, and the exchange of information between government and citizens is greatly impeded.

Further, government repository databases are organized according to the needs of government but are not organized according to the needs of various industries. Therefore, the highly specialized needs of each of a plurality of different industries can not be met by existing government systems. Nor do governments have the resources necessary to adapt their systems to meet these specialized needs. Moreover, many believe that governments should not expend limited resources to provide application specific services to particular industries.

Finally, even if problems of compatibility and accessibility were overcome by adapting the systems used by government to enable direct electronic access by the public to government repositories, the security of information in those repositories would be significantly threatened by enabling direct public access. That is, enabling direct access by the public would increase the probability of contamination of information in the repository and would increase the probability of unauthorized access to sensitive non-public information.

A need exits for systems and methods that overcome these and other obstacles to the electronic exchange of information between governments and its citizens.

SUMMARY OF THE INVENTION

The present invention provides systems and methods that overcome existing obstacles to the electronic exchange of information between government and its citizens.

The present invention provides controllable access, by way of a distributed computer network, to information contained in government records stored in a repository database. Information in the repository is copied into a replica database that is remote from the repository. The replica database may be continually updated with new information added to the government repository. Also, individuals and entities may post information to the replica database that is required by law to be made public or required by law to be provided to government. Further, the present invention provides for the archival and preservation of historical records in a repository that the government may dispose of after a certain length of time.

According to the methods of the present invention, public records are managed in a digital environment and original documents and signatures are stored in digital format. Fees imposed in conjunction with providing and accessing information may be transferred electronically as part of a transaction.

Access to information in the replica database is controlled to exclude access to sensitive information by individuals who have no legal right to the sensitive information. The invention provides for the posting of conditions imposed by law for obtaining access to information in the replica database and conditions imposed by law for the use of the information obtained. To the extent that written permission is required to access information, the invention may provide electronic means to apply for such permission. Thus, a person desiring access to information may ascertain what criteria must be satisfied to obtain such access. Application for permission to access information may be submitted electronically, and notice of the grant or denial of permission may be provided electronically. Where permission is granted, the applicant may be assigned a password to enable access to the information for which access permission was granted. In addition, other access control technologies, such as biometrics identification, may be employed to control access to information in the replica database.

Thus, the present invention provides an independent data system that can securely enable access to information in a government repository by numerous third parties without providing direct access to the government repository. In effect, the independent data system acts as an elaborate firewall to shield the government database from potentially harmful third party connections.

The present invention provides for the creation of a plurality of secondary databases, each containing an application-specific subset of information in the replica database. These secondary databases may comprise data tables organized to facilitate the efficient search and retrieval of information most pertinent to a specific application. The provision of data tables optimizes performance and reduces memory storage requirements. Further, irrelevant information or information the disclosure of which would violate a person's privacy rights can be excluded from the secondary database. Thus, the provision of application-specific secondary databases improves system performance while providing an additional layer of security.

The invention further provides for the implementation of application-specific interface processes for accessing information from, as well as providing information to, the replica database. Thus, for each application-specific secondary database, a customized interface may be provided to facilitate the search and retrieval of information in the secondary database. For example, a display of data entry fields, point-and-click icons, and navigational controls tailored to accessing the specific informational content of one or more secondary databases may be provided. The present invention also provides for the implementation of additional application-specific functionality such as specialized accounting and report-generating modules. Thus, different application-specific interface may be provided those are custom designed to meet the specific needs of each of a plurality of different entities.

The invention also provides for the coherent unification of information in the repositories of different government entities. The present invention provides for a central database comprising information from the repositories of multiple different governmental entities, federal, state and local. Thus, the records of many government entities may be accessed from a single location. Moreover, the invention overcomes the problem of accessing records that are stored by different governments in different organizational formats. The present invention provides a unified organizational structure of information from records stored by different governments to enable access to the information by way of a single coherent methodology.

The invention also provides for the tracking of each and every instance that a user of the invention attempts to access personal or otherwise sensitive information. An audit report can then be created that identifies the user attempting such access and the information attempted to be accessed. These audit reports may be stored for subsequent production as may be required by law.

The independent data system of the present invention further enables the redundant and robust connectivity that can be provided by a distributed computer network such as the Internet. Thus, access to the replica database may be provided at a web site accessible by numerous Internet connections to computers at remote locations. Moreover, by providing an independent replica database, access to data contained in a government repository database is provided even when the government database is off-line. Additionally, the independent database of the present invention effectively transfers the cost of providing efficient access to government records from the government to the private sector. Through this methodology commercial interests acquire the ability to exchange information with the government without any imposition on government resources.

These and other features and aspects of the present invention are better understood with reference to the attached drawings and following description of various embodiments of the invention.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
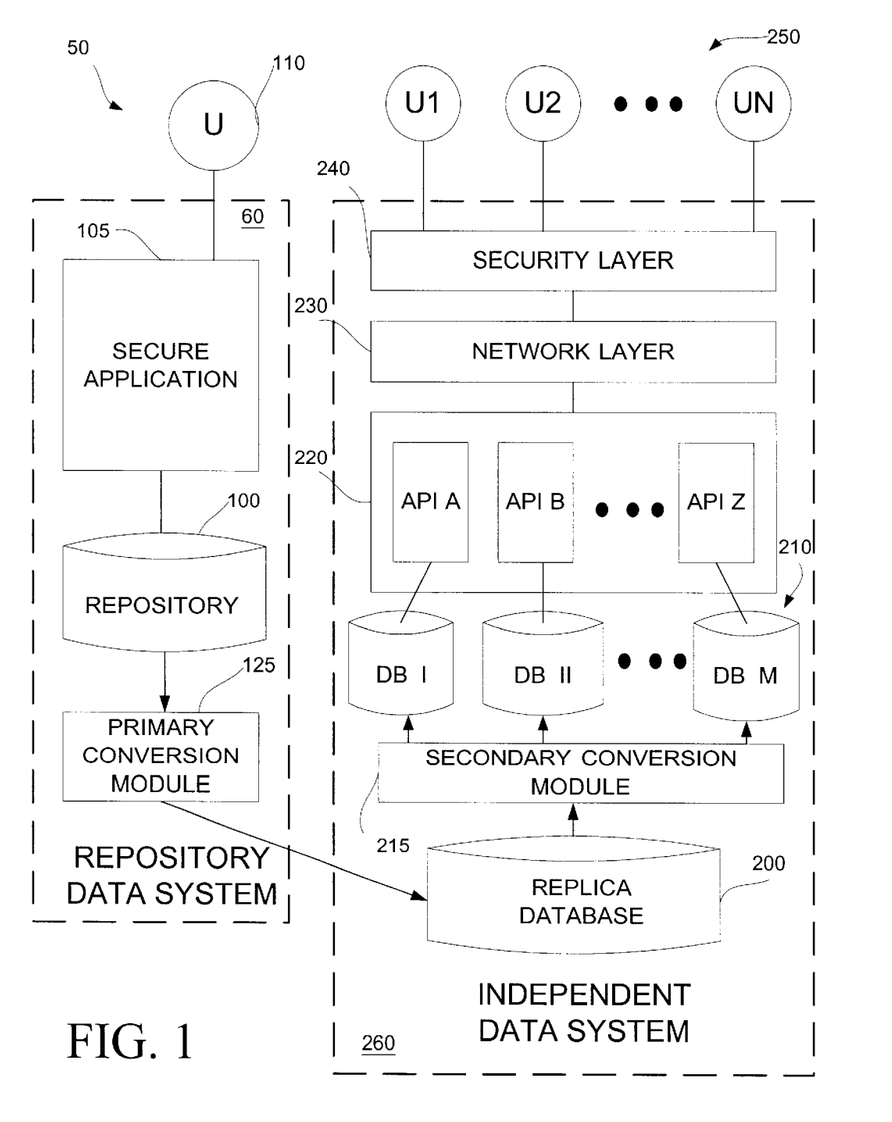
FIG. 1 illustrates one embodiment of the present invention.

FIG. 1 illustrates but one embodiment of the present invention as a data system 50. In an exemplary embodiment, data system 50 may include a repository data system 60. Repository data system 60 may include a government-operated repository 100, which may be accessed through a secure application 105 by an authorized user 110. The present invention generally provides for the copying or replication of information or data contained in repository 100 to a replica database 200 operably coupled to an independent data system 260.

In a copying or replication process any information in repository 100 deemed to be unnecessary could be filtered and thereby excluded from replica database 200 through a primary conversion module 125. For example, any information in repository 100 that is strictly for governmental use only may also be filtered and thereby excluded from replica database 200. Primary conversion module 125 may include a set of instructions to carry out user defined first criteria. Typically, the system implementation of repository 100 and secure application 105 can be incompatible with the needs of a diverse plurality of users 250 because of system incompatibilities, data organization methodologies and security requirements.

In one exemplary implementation, primary conversion module 125 could be readily customized through specifying the first criteria to satisfy the information access requirements of an authorized user for which replica database 200 is created. For example, the first criteria may include a find criterion, a replicate criterion, and/or a filter criterion provided through a graphical user interface having an input template or a command line operated interface. Secure application 105 may generally execute primary conversion module 125 to realize the first criteria functionality.

As persons skilled in the art will appreciate that primary conversion module 125 could be readily devised for a particular operating platform employing suitable programming tools. For example, one or more compatible high level programming languages such as BASIC, C, C++, Java, mainframe languages such as EBCDIC, COBOL or visual programming languages such as Vbasic may be advantageously employed for a specific operating platform including legacy platforms such as for an IBM mainframe operating system from International Business Machines Corporation, Armonk, N.Y.

In accordance with one aspect of the present invention a plurality of secondary databases 210 such as DB I, DB II, DB III may be provided. Information in replica database 200 may be organize-able into information or data subsets through a secondary conversion module 215. Each information subset may contain information or data that is specific to a particular application or use. Each information or data subset may be copied into a different one of the plurality of secondary databases 210 utilizing secondary conversion module 215. Information the disclosure of which would violate the privacy rights of a person could be filtered out through secondary conversion module 215, thereby may be excluded from a secondary database such as DB II. Moreover, information that may not be allowed to be accessed by an authorized user of a secondary database such as DB I could be encrypted in that secondary database.

Secondary conversion module 215 may include a set of instructions to carry out user defined second criteria. In one exemplary implementation, secondary conversion module 215 could be readily customized through specifying the second criteria to satisfy the information access requirements of an authorized user for which secondary database such as DB I is created. For example, the second criteria may include a security criterion and a custom format criterion provided through a graphical user interface having an input template or a command line operated interface. Independent data system 260 may generally execute secondary conversion module 215 to incorporate the second criteria functionality. It is to be understood that secondary conversion module 215 could be readily devised for a particular operating platform employing suitable programming tools as generally utilized to synthesize primary conversion module 125.

For example, an insurer may desire information relevant to the risk of insuring an individual. The information an insurer may employ to make a risk assessment is usually regulated by a state insurance regulator. The present invention may provide for the creation of a secondary database such as DB II containing only information an insurer may legally consider in making an insurability decision, while excluding from the secondary database other private information about an individual. Moreover, access to this secondary database can be limited to insurers who have a legal right to the information contained therein, while excluding other entities that do not have a legal right or a legitimate business interest in the information contained therein. Other application-specific secondary databases are encompassed by the present invention.

In one embodiment consistent with the present invention, information or data in a secondary database 210 may be generally organized to form data tables. Such data tables are organized to facilitate the efficient search and retrieval of information most pertinent to the application for which the secondary database 210 is created. The data tables also may facilitate a reduction in the amount of memory required to store the information or data.

According to one aspect of an exemplary embodiment of the present invention, a plurality of customized application-specific interfaces 220 such as API A, API B, and API Z may be provided. An application-specific interface 220 may comprise mechanisms for the receipt of information or data requests and for the search and retrieval of requested information from one or more secondary databases 210. An application interface could be readily customized through specifying new second criteria for secondary conversion module 215 to satisfy the information access requirements of an authorized user for which a secondary database 210 such as DB III is created.

The present invention also may provide for a network layer 230 that enables connectivity to one or more access locations. Such connectivity may be a plurality of Internet connections, dedicated wire line connections, and similar connection arrangements. The network layer may therefore serve multiple connections by way of the Internet, as well as local area networks, wide area networks, virtual private networks, and other network types.

The present invention also may provide for a security layer 240 to prevent unauthorized access to information. Thus, access to information in replica database 200 could be controlled to exclude access to sensitive information by individuals who have no legal right to the sensitive information.

Users 250 comprise a diverse plurality of individuals, as well as private and public sector entities. Each user 250 may access the independent data system 260 from a remote location by way of a computer using a keyboard and a video monitor. In an exemplary embodiment a video display comprising data entry fields, point-and-click icons, and navigational controls is accessible at a web site by way of a plurality of Internet connections to the remote locations of users 250. A user 250 may select from a plurality of displays a desired set of data entry fields for requesting information from independent data system 260, and viewed a display of requested information retrieved from independent data system 260.

The invention also may provide for the display of conditions imposed by law for obtaining access to information or data in replica database 200 and conditions imposed by law for the use of the information or data obtained. To the extent that written permission is required to access information, the invention generally provides electronic access to an application to apply for such permission. Thus, a person desiring access to information or data may ascertain what criteria must be satisfied to obtain such access. Application for permission to access information may be submitted electronically, and notice of the grant or denial of permission may be provided electronically. The entity granting or denying permission, typically a government entity may access the application from a remote location connected to independent data system 260. And, in response, may return a decision utilizing application-specific interface 220 such as API A for an application module.

Where access permission is granted, the applicant may be assigned a password to enable access to the information for which access permission was granted. Associated with the password will be an identification of the specific one or more secondary databases to which access is permitted. In addition, other access control technologies, such as biometrics identification, may be employed to control access to information in replica database 200.

Replica database 200 may be continually updated with new information added to repository 100. This may occur on a periodic basis, for example, nightly, or may occur merely occasionally. A significant advantage of the invention is that information may be stored in replica database 200 indefinitely, whereas information in repository 100 may be deleted or removed from repository 100. Further, even if, for some unfortunate reason, information in repository 100 is contaminated, corrupted or otherwise lost, that information may exist in replica database 200, which thereby serves as a backup to the government repository. Conversely, by providing secondary databases 210 and security layer 240, protection of information in replica database 200 from hackers is generally provided.

Information may also be entered into independent data system 260 by a user 250. This may enable a user to provide to a government entity information required by that entity, and also can enable a user to publish information required by law to be made public. Further fees associated with a transaction concerning the provision or retrieval of information from independent data system 260 may be paid by electronic funds transfer. For example, a user 250 of independent data system 260 may be a bank or other financial institution that provides transaction accounts. A first one of the users 250 of independent data system 260 may post a fee to a transaction account of a second one of users 250 or to the account of a third party who is not a user of independent data system 260. Thus, fees required by a government entity in connection with a required filing of information with the entity may be electronically transferred by way of independent data system 260.

Figure 2:
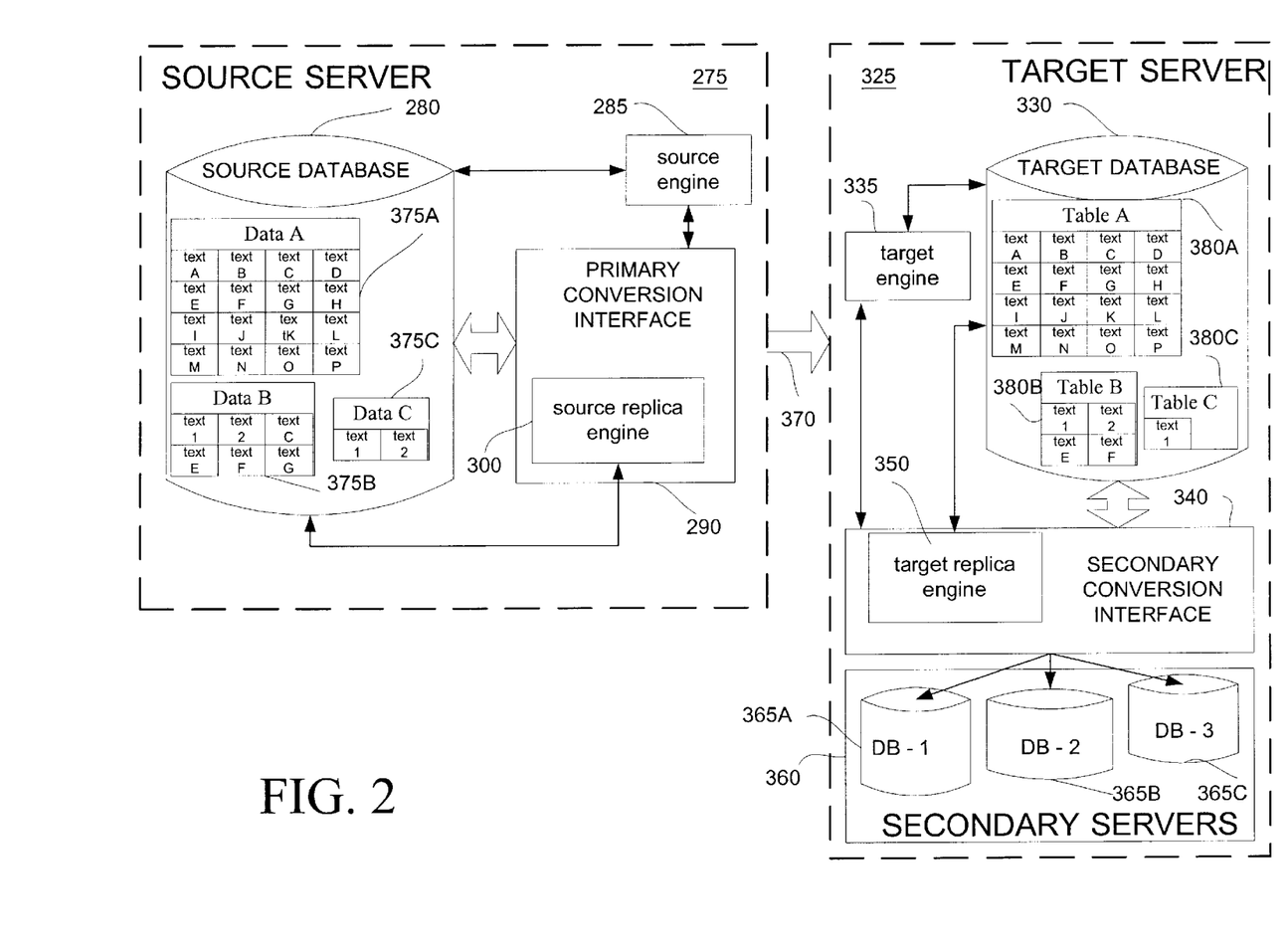
FIG. 2 shows an exemplary implementation of the one embodiment of FIG. 1.

FIG. 2 shows an exemplary implementation of the one embodiment of FIG. 1. As shown in FIG. 2, a source server 275 may include a source database 280 and a source engine 285 for operating on source database 280 to enable a replication process through a replica engine. In addition, a primary conversion interface 290 may include a source replica engine portion 300 for performing a primary conversion process of the replication process. Likewise, a target server 325 may include a target database 330 and a target engine 335 for operating on target database 330 to enable the replication process. In addition, a secondary conversion interface 340 may include a target replica engine portion 350 for performing a secondary conversion process of the replication process. Further, one or more secondary servers 360 may receive an associated portion of the replicated data in respective secondary databases 365A through 365C such as DB-1, DB-2, and DB-3. The associated portion of the replicated data may be generally determined by source and target replica engine portions 300, 350, respectively, responsive to a user defined criteria or set of rules. Target server 325 may receive such replicated data through a communication channel 370 generally unitizing a communication protocol to provide a desired data integration or migration for the replication process. A variety of such communication protocols are known. One product that may be deployed in a replication process for data integration or migration is known as Data Junction from Data Junction Corporation, Austin, Tex. for e-Business Infrastructure, Application Integration, and/or XML Integration. Others are known to those of skill in the art.

In operation, source database 280 may include information or data in a variety of formats including a first data format (Data A) 375A, a second data format (Data B) 375B, and a third data format (Data C) 375C. First, second, and third data formats 375A through 375C may be converted deploying the replication process to a first data table (Table A) 380A, a second data table (Table B) 380B, and a third data table (Table C) 380C within target database 330. Source database 280 may be replicated to reduce contention or access to source database 280 to provide a stand-alone data access system including secondary databases 365A through 365C such as DB-1, DB-2, and DB-3. Such Replicated databases may provide information or data fields for target database 330 that may allow users or clients to create or inspect data without accessing source database 280. Accordingly, for users or clients interested in only specific aspects of source database 280, replicas of particular regions or fragments of source database 280 can be provided in target database 330. Moreover, replicated databases also may provide a backup in the event of database storage media failure.

In an exemplary replication process, one or more copies of source database 280 may be mapped into database replicas such as DB-1, DB-2, and DB-3 associated with particular users or clients that seek access to the information of source database 280. For example, a copy of source database 280 is created and is typically applied to the replica database through source replica engine portion 300 and target replica engine portion 350 cooperatively interfacing with source database 280 and target database 330.

Updating is a process of maintaining a defined set of data in more than one location. An updating process generally includes copying designated changes from one location (a source) to another (a target), and synchronizing the data in both locations. The source and target databases can be in servers such as a DB2 database or a DB2 for OS/390 subsystem that are on the same machine or on different machines in a distributed network. Relational or non-relational data can be replicated and updated to reflect changes between any relational or non-relational databases, respectively, using database products such as Microsoft SQL Server and Sybase SQL Server to enable replication of data between both relational and non-relational database products. A replication environment may be customized depending on a data update schedule instructions to handle new transactions in source database 280. For example, to update target database 330, in accordance with a predetermined update schedule, target database 330 access may be locked and target database 330 is overwritten with the data of an updated source database 280.

According to the methods of the present invention, replica database 200 may comprise information obtained from a plurality of repositories of a plurality of government entities, whether state, federal or local. This may enable a user 250 to access information from a plurality of government entities from a single remote location. Moreover, the invention may overcome the problem of accessing records that are stored by different governments in different organizational formats. For example, different states organize motor vehicle records in different ways. A person or entity attempting to gather information concerning the ownership history of a motor vehicle that has been registered in more than one state will be confronted with accessing similar information stored in different ways.

The present invention generally provides a unified organizational structure of information from records stored by different governments to enable access to the information by way of a single coherent methodology. Thus, a single secondary database 210 could contain an information subset comprising information from motor vehicle records obtained from the governments of a plurality of states. This motor vehicle data may be organized to form data tables that facilitate efficient search and retrieval by an entity seeking specific information relating to one or more motor vehicles. Thus, a single application specific interface process 220, may be provided for accessing information from the secondary database 210 that contains the motor vehicle information. This relieves a user 250 of the burden of having to learn how to access a plurality of different records organized in different formats.

An application specific interface process 220 may further be customized to serve the needs of a specific entity. For example, an interface 220 may be constructed to allow automobile dealers, financial institutions and other government-approved parties to view motor vehicle records and to register motor vehicle title, registration and lien transactions. Thus, a set of data entry field may be provided, some optional and some required, such as Vehicle Identification Number, vehicle make and model, model year, registration number and date, license plate number, odometer reading, and other information. One or more software modules within interface 220 may be provided that determines and calculates state taxes, determines information concerning present and prior owners, checks against possible odometer roll back, as well as perform other useful functions. Information provided by independent data system 260 to a user 250 may be conditioned upon the provision by a user 250 of certain information.

Thus, interface process may be designed to facilitate interactive exchange of information according to a set of rules/criterion specifically applicable to the needs of a particular user 250. The interactive exchange may also be governed by applicable laws and regulations. In addition to the interactive functions facilitated by interface 220, an embodiment of the present invention also incorporates "push" technology into interface 220 to compile information in an organized format and electronically and periodically send the compiled information to a user 250 who is authorized to receive that information. Thus, an insurer may periodically receive information concerning the driving records of a pool of drivers to enable the insurer to periodically update its risk assessments. The report may include aggregate statistics concerning the drivers in the pool as well as information concerning each individual driver.

A user may be authorized to receive information in more than one secondary database accessible through a common application interface. In some cases a more efficient organization of information in independent data system 260 can be obtained in this manner. One or more secondary databases 210 may contain only information that will appear in a report to be provided to a user, while excluding other information that may be accessed by a user 250 from a different secondary database 210, but that will not appear in a report. One or more secondary databases 210 may comprise information derived from a compilation of data from one or more other secondary databases 210. Similarly, one or more secondary databases 210 may comprise information derived from computations using data from one or more other secondary databases 210. Thus, a single application interface 220 may interface between one or more users 250 and one or more secondary databases 210.

In an exemplary embodiment of the present invention, interface 220 also may incorporate a module for tracking requests for information and attempts made to access information in system 300. An audit report is created that identifies the user attempting such access and the information to which access was attempted. The tracking implemented may be restricted to personal information or information otherwise considered to be sensitive. Implementation of the present invention generally allows for periodic upgrading to new database platforms and also allows for interfacing with new hardware or software platforms as they are developed.

Figure 3:
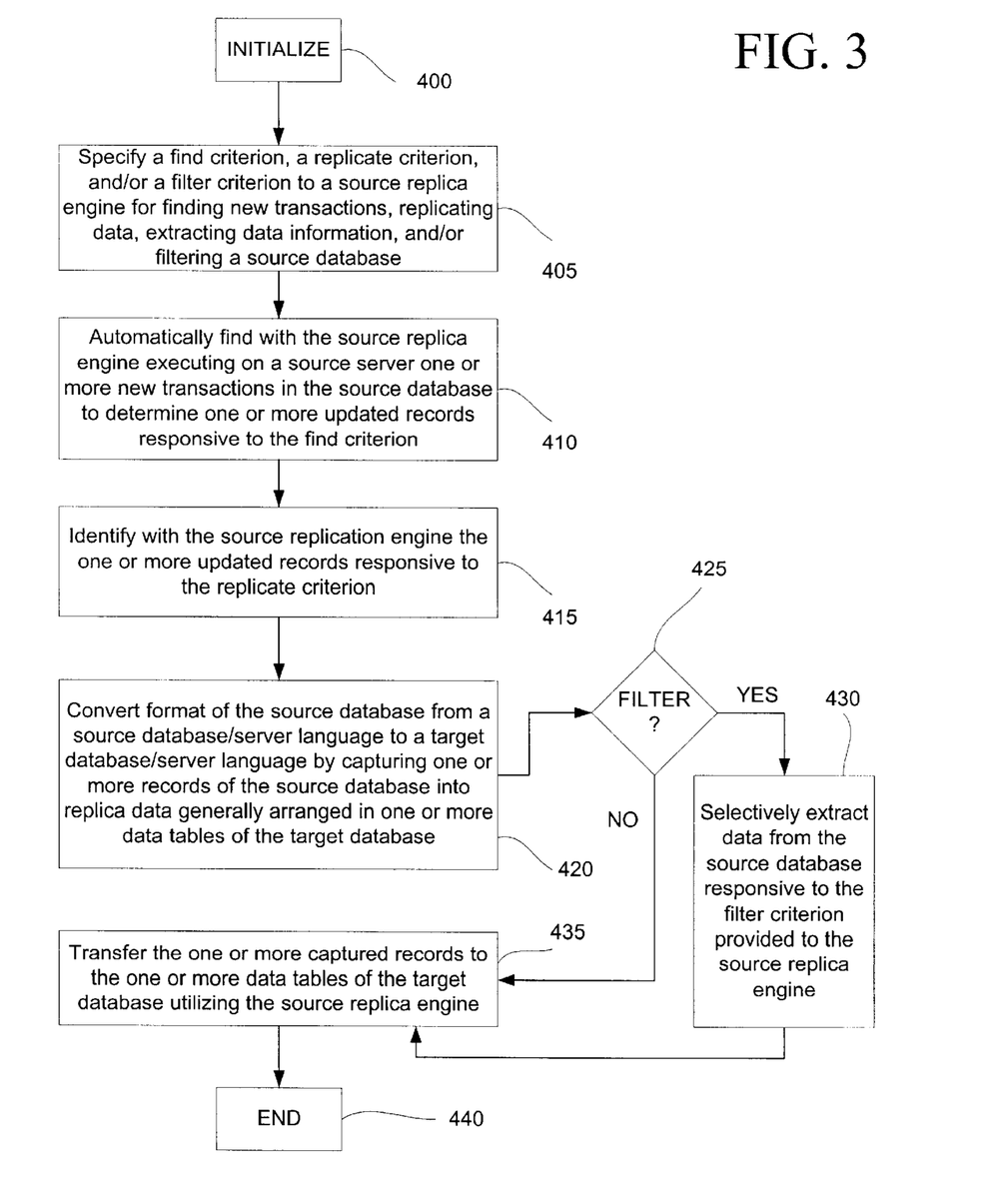
FIG. 3 depicts a flow chart of exemplary steps embodying a primary conversion process in accordance with one aspect of a replication process consistent with the present invention.

FIG. 3 depicts a flow chart of exemplary steps embodying a primary conversion process in accordance with one aspect of a replication process consistent with the present invention. With reference to FIGS. 2 and 3, In step 400, the primary conversion process is initialized. In step 405 a user may specify a find criterion, a replicate criterion, and/or a filter criterion to source replica engine 300 for finding new transactions, replicating data, extracting data information, and/or filtering source database 280.

In step 410, the primary conversion process may automatically find utilizing source replica engine 300 generally executing on source server 275 one or more new transactions in source database 280 to determine one or more updated records responsive to the find criterion specified in step 405. In step 415, the one or more updated records responsive to the replicate criterion of step 405 may be identified through source replication engine 300. In step 420, format of source database 280 may be converted from a source database/server language to a target database/server language by capturing one or more records of source database 280 such as Data A 375A, Data B 375B, and Data C 375C into replica data generally arranged in one or more data tables such as Table A 380A, Table B 380B, and Table C 380C of target database 330.

A filter test may be performed in step 425 to determine if a filter operation is desired generally determined by a user defined filter criterion of step 405. If the filter test is affirmative the primary conversion process may proceed to step 430. In step 430, data may be extracted from source database 280 responsive to the filter criterion provided to source replica engine 300. Conversely, if no filter criterion is specified, step 430 may be skipped. In step 435, transferring of the one or more captured records to the one or more data tables of the target database is generally performed utilizing source replica engine 300. At step 440 the primary conversion process may end and wait for a next cycle of replication, access, and/or update process to begin.

Figure 4:
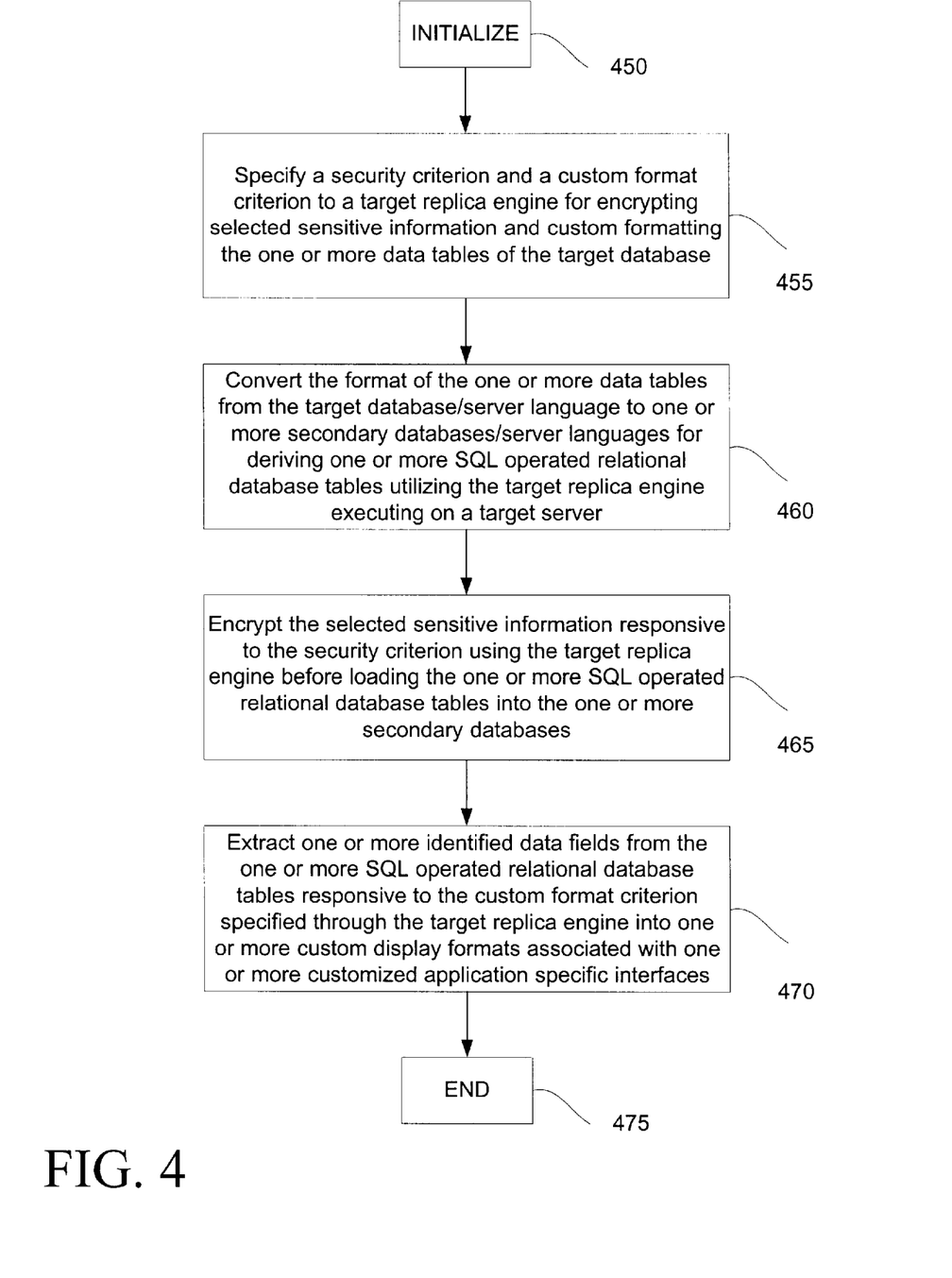
FIG. 4 shows a flow chart of exemplary steps embodying a secondary conversion process consistent with one aspect of a replication process according of the present invention.

FIG. 4 shows a flow chart of exemplary steps embodying a secondary conversion process consistent with one aspect of a replication process according of the present invention. With reference to FIGS. 2, 3 and 4, In step 450, the secondary conversion process is initialized. In step 455, a user may specify a security criterion and a custom format criterion to target replica engine 350 for encrypting selected sensitive information and custom formatting the one or more data tables 380A through 380C of target database 330.

In step 460, the format of the one or more data tables 380A through 380C may be converted from the target database/server language to one or more secondary databases/server languages for deriving one or more SQL operated relational database tables utilizing target replica engine 350 generally executing on target server 325. In step 645, the selected sensitive information may be encrypted responsive to the security criterion of step 455 generally using target replica engine 350 before loading the one or more SQL operated relational database tables into one or more secondary databases 365A through 365C. In step 470, one or more identified data fields may be extracted from the one or more SQL operated relational database tables responsive to the custom format criterion specified in step 455 through generally employing target replica engine 350 into one or more custom display formats associated with one or more customized application-specific interfaces 220. At step 475, the secondary conversion process may end and wait for a next cycle of a replication, access, and/or update process to begin.

Figure 5:
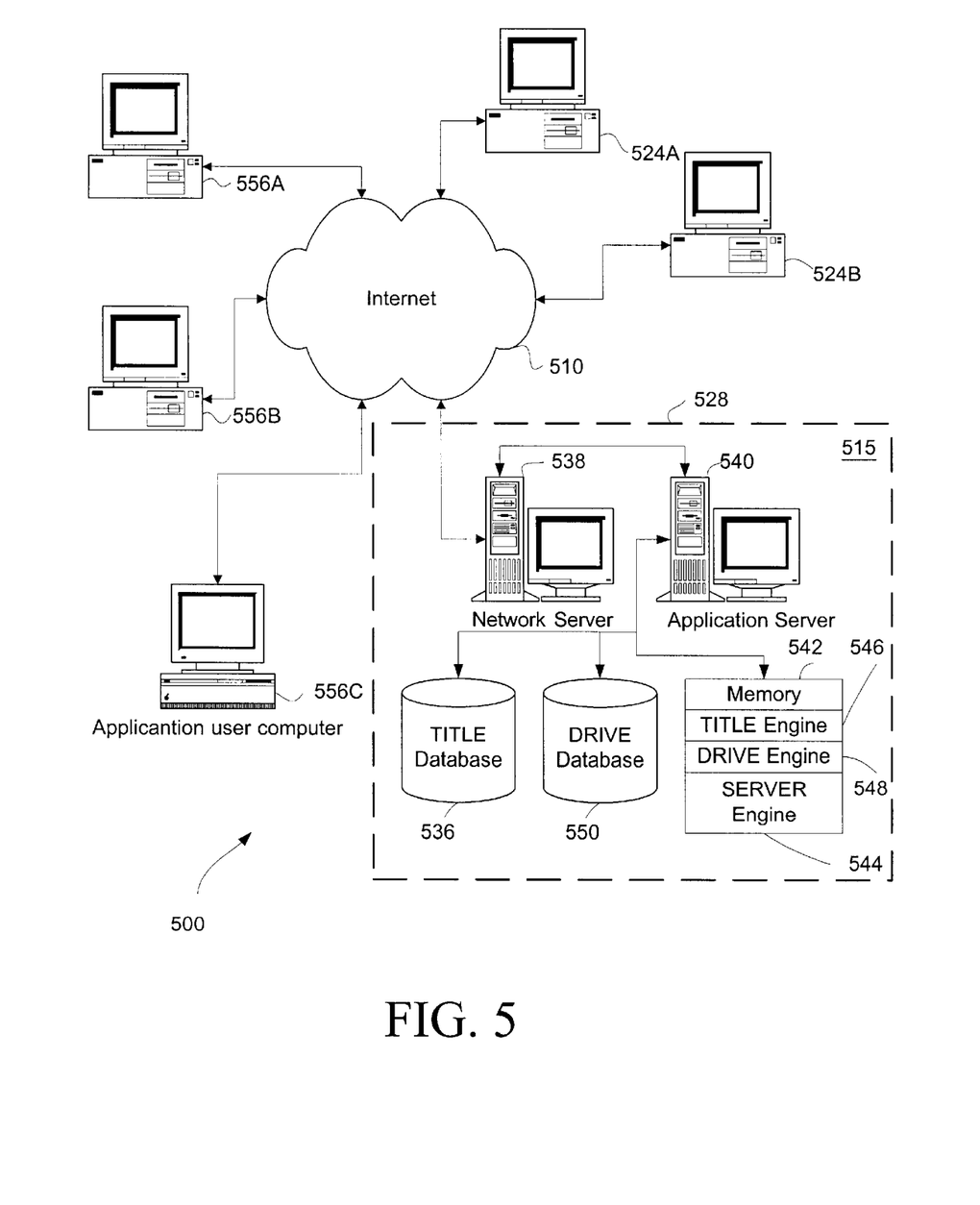
FIG. 5 shows exemplary hardware/software components in a system for replicated secondary databases to provide controllable access to information contained in a repository using Internet according to one aspect of the present invention.

FIG. 5 shows exemplary hardware/software components in a system 500 for replicated secondary databases to provide controllable access to information contained in a repository (not shown) using Internet 510 according to one aspect of the present invention. With reference to FIGS. 3, 4 and 5, an individual may use a first computer, such as an IBM compatible computer 524A, 524B 556A, or 556B or a Macintosh personal computer 556C, to request over a computer network, such as the Internet 510, a criteria template from an information processor 515 that preferably services multiple first individuals.

The first individuals can request a blank form for creating a new criteria template or a previously created criteria template for editing. In steps 405 and 455, the first individual may complete one or more criteria templates. The first individual may use the criteria template to define the criteria illustrated in steps 405 and 455, which specifies the replication process for source database 280 to generate target database 330. The notification criteria can include sub-parts, with different sub-parts causing different individuals to be notified contingent on the same or different data in the electronic form. The first individual may also use the criteria template to define a replication environment that describes, either explicitly or by a rule, what data may be replicated and the form and content of the replication. The completed criteria template is posted in step to information processor 515. Such criteria may be stored in a title database 536 having vehicle information and data or a drive database 550 having driver information and data according to the desired access requested by the first user or individual.

Information processor 515 may include a network server 538, such as a Sun Solaris UltraSparc Server, executing communications software, such as Apache HTTPD Server from The Apache Group, www.apache.org, to communicate over computer network including Internet 526. Also at processor 515 may be an applications server 540, preferably operating behind a firewall, in data communications with network server 538 and having a memory 542 that contains software used in the present invention, including an information server engine 544, for generating and processing forms, and a replica engine such as a title engine 546 and/or a drive engine 548 in data communications with applications server 540. The software operating on the applications server 540 and network server 538 communicate with each other and with necessary databases using standard protocols, such as CGI or Apache API. Skilled persons will understand that additional or different servers may be suitably deployed.

The first individuals could be part of a single enterprise and connected to processor over a local area network, a wide area network, or an Intranet. Alternatively, information processor 515 could service many unrelated first individuals, each having appropriate access to the content of title database 536 and/or drive database 550 being accessible through information processor 515 and connected to a source database (not shown) through Internet 526. Typically, many users could continually completing or editing electronic data requests and posting them over computer network such as Internet 526.

For example, title engine 546 compares the content of a posted data request along with the criteria to title database 536. If the posted data request content along with the criteria does not match with a requested data in title database 536, the system 500 may acknowledge receipt of request with no data returned. If the criteria of any submitted data request meets any of the stored data in title database 536, the matched data may be accordingly returned to the requesting user. Although the method of determining the recipient of the data or information may be pre-specified, the actual recipient of the data or information may depend upon the content of a user provided appropriate access information, and may not, therefore, be known before the content of the user provided appropriate access information is analyzed. The form and content of notification to a user in response to a user data request may be determined, in accordance with a notification specification. The recipient may be notified by e-mail, or a file can be downloaded to the recruiter's computer using another protocol, such as file transport protocol (FTP). The notification may include sending a copy of an entire form that matched the criteria. The notification may include sending text that is determined by or includes content from the form that meets the criteria.

The embodiments described above are examples of how the present invention can be implemented and employed. Variations will be obvious to persons of ordinary skill in the art given the disclosure of the invention herein. The scope of the invention is not limited by the specific examples given above.

Although the present invention and its advantages have been described in detail, it should be understood that various changes, substitutions and alterations can be made to the embodiments herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing controllable access to information contained in government records stored in a repository, comprising:

copying information from the repository to a replica database;

converting and filtering information taken from the replica database to produce a plurality of secondary databases based upon information access requirements of specific users, each secondary data base containing a subset of information taken from the replica database; and providing an application interface process for each secondary database to enable controllable access to information in a secondary database.

2. The method of claim 1, further comprising, supplementing information in the replica database with new information added to the repository.

3. The method of claim 2, further comprising, supplementing information in the replica database with new information added by a user of the replica database.

4. The method of claim 1, further comprising:

assessing fees information associated with accessing a secondary database; and electronically transferring the assessed fees information to a user of the secondary database.

5. The method of claim 1, further comprising, controlling access to restricted information in the replica database to exclude access by persons without legal authority to receive the restricted information.

6. The method of claim 1, the converting and filtering step comprising, excluding from one of said secondary databases information prohibited by law to be accessed by an entity.

7. The method of claim 1, further comprising, providing access to information concerning conditions imposed by law for obtaining access and for using information in the replica database.

8. The method of claim 1, further comprising:

enabling input of a request for permission to access information in a secondary database;

transferring the request to an entity with authority to grant or deny permission to access the information for which access permission is requested;

returning to the requester of access permission a notice of the grant or denial by the entity of the requested permission;

providing for the identification of the requestor if access permission is granted; and enabling access to the information for which access permission is granted.

9. The method of claim 1, the converting and filtering step comprising, organizing information in a secondary database to form data tables for facilitating an efficient search and retrieval of specific information in the secondary database by specific users.

10. The method of claim 1, said application interface process comprising:

receiving requests for information in a secondary database;

retrieving the requested information from the secondary database; and displaying the requested information.

11. The method of claim 10, said application interface process further comprising, providing data entry and navigation mechanisms to search for specific information contained in the secondary database.

12. The method of claim 1, further comprising, prior to the copying step, filtering information contained in the repository to preclude access to information specified by law not to be accessible to the public.

13. The method of claim 1, the converting and filtering step comprising, filtering information contained in the repository to exclude information from the replica database that is extraneous or not pertinent to a specific use.

14. A system for providing controllable access to information contained in government records stored in a repository, comprising:

a replica database comprising information copied from the repository;

a plurality of secondary databases, each containing a subset of information taken from the replica database;

a conversion and filtering module to produce respective subsets of information taken from the replica database for inclusion in the plurality of secondary databases based on information access requirements of specific information users;

an application interface for each secondary database to enable controllable access to information in a secondary database; and a replication engine coupled between the repository, the replica database, the plurality of secondary databases, and the application interface, the replication engine adapted to provide a replication process for information contained in government records.

15. The system of claim 14, further comprising:

an updating mechanism to update information in the replica database with new information added to the repository.

16. The system of claim 14, further comprising:

a supplementing mechanism to supplement information in the replica database with new information added by a user of the replica database.

17. The system of claim 14, further comprising:

a request processing mechanism to assess fees information associated with accessing a secondary database and electronically transferring the assessed fees information to a user of the secondary database.

18. The system of claim 14, the conversion and filtering module comprising:

a filtering mechanism for extracting information contained in the replica database to preclude access to information specified by law to be not accessible to the public.

19. The system of claim 14, further comprising:

a request response mechanism to notify information associated with accessing a secondary database to a user of the secondary database.

20. The system of claim 14, further comprising, a primary filtering module for precluding information specified by law not to be accessible to the public from being copied from the repository to the replica database.

21. The system of claim 20, the primary filtering module filtering information contained in the repository to exclude information from the replica database that is extraneous or not pertinent to a specific use.

22. A system for providing controllable access, by way of a computer network, to information contained in government records stored in a repository, comprising;

a replica database comprising information copied from the repository;

a plurality of secondary databases, each containing a subset of information taken from the replica database;

a data conversion and filtering module to produce respective subsets of information taken from the replica database for inclusion in the plurality of secondary databases based on information access requirements of specific users;

an application interface for each secondary database to enable controllable access to information in a secondary database;

a web site accessible at a plurality of remote locations by one or more intermit connections for accessing information in a secondary database through the application interface associated with the secondary database; and a replication engine coupled between the repository, the replica database, the plurality of secondary databases, and the application interface, the replication engine adapted to provide a replication process for information contained in government records.

23. The system of claim 22, wherein an application interface further provides for:

enabling input of a request for permission to access information in a secondary database;

transferring the request to an entity with authority to grant or deny permission to access the information for which access permission is requested;

returning to the requestor of access permission notice of the grant or denial by the entity of the requested permission;

providing for the identification of the requestor if access permission is granted; and enabling access to the information for which access permission is granted.

24. The system of claim 22, the data conversion and filtering module comprising, a mechanism for producing one or more data tables for organizing data in one of said plurality of secondary databases according to user requirements.

25. The system of claim 24, each said one or more data tables comprising SQL operated relational database tables to facilitate an efficient search and retrieval of specific information in the one of said plurality of secondary databases.

26. The system of claim 22, said application interface process, further comprising:

data entry and navigation mechanisms to search for specific information contained in one of said plurality of secondary databases; and access mechanisms for retrieving and displaying information resulting from the search.

27. The system of claim 26, said access mechanisms, further comprising:

data fields to display information extracted from one or more data tables in one of said plurality of secondary databases responsive to a user defined criteria.

28. A method for providing controllable access to information contained in a plurality of government records maintained by different governmental entities and stored in different repositories, comprising:

copying information from each of the different repositories into a replica database;

converting and filtering information taken from the replica database to produce a plurality of secondary databases based upon information access requirements of specific users, each secondary data base containing a subset of information taken from the replica data base; and providing an application interface process for each secondary database to enable controllable access to information in a secondary database.

29. A system for providing controllable access to information contained in a plurality of government records maintained by different governmental entities and stored in different repositories, comprising:

a replica database including information copied from each of the different repositories;

a plurality of secondary databases, each containing a subset of information taken from the replica database;

a conversion and filtering module to produce respective subsets of information taken from the replica database for inclusion in the plurality of secondary databases based on information access requirements of specific information users; and an application interface for each secondary database to enable controllable access to information in a secondary database; and a replication engine coupled between the repositories, the replica database, the plurality of secondary databases, and the application interface, the replication engine providing a replication process for information contained in the repositories.

* * * * *

UNITED STATES PATENT AND TRADEMARK OFFICE
CERTIFICATE OF CORRECTION

PATENT NO. : 6,711,575 B1
DATED : March 23, 2004
INVENTOR(S) : Applewhite et al.

It is certified that error appears in the above-identified patent and that said Letters Patent is hereby corrected as shown below:

Column 12,
Line 19, delete "data base" and insert -- database --.

Signed and Sealed this

Seventeenth Day of August, 2004

JON W. DUDAS
*Acting Director of the United States Patent and Trademark Office*